Sept. 3, 1940.    J. GALTER    2,213,492
TURNABLE MEANS FOR CAMERA TAKE-UP SPOOLS
Filed April 17, 1940
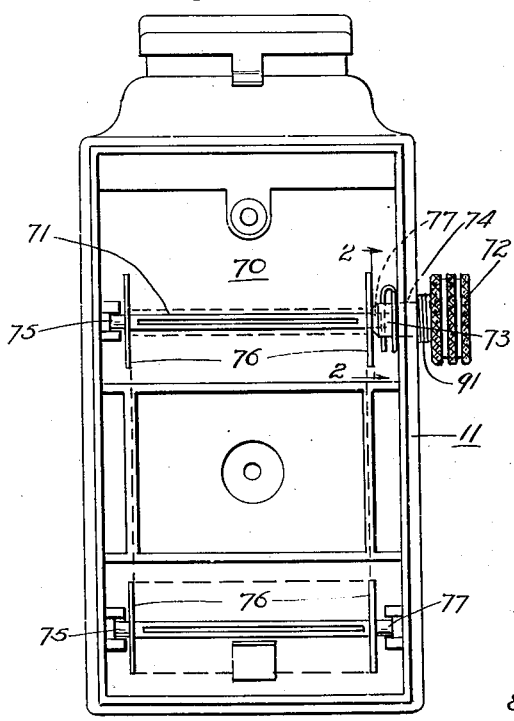
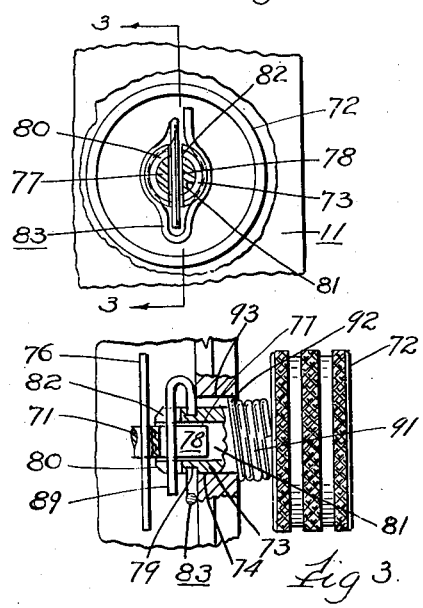
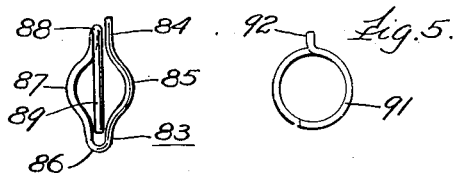
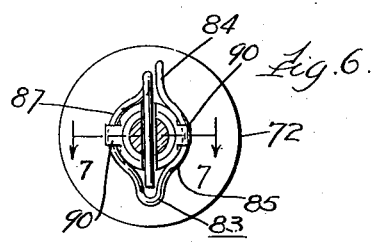
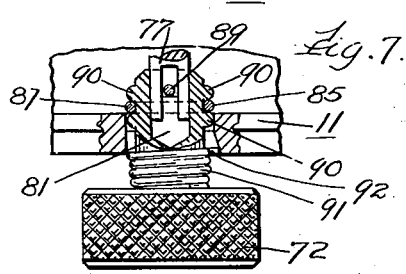
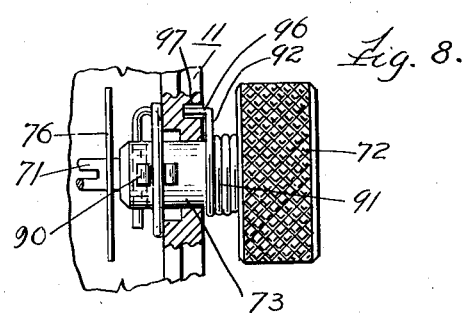
Inventor
Jack Galter.
by James R. McKnight
his Attorney Patented Sept. 3, 1940

2,213,492

UNITED STATES PATENT OFFICE 2,213,492

TURNABLE MEANS FOR CAMERA TAKE-UP SPOOLS

Jack Galter, Chicago, Ill.

Application April 17, 1940, Serial No. 330,130

3 Claims. (Cl. 242—71)

My invention relates to improvements in the turnable means for the take-up spools of cameras.

For some time the shanks of turning members attached to the take-up spools of cameras have required the drilling of a hole therein for the attachment of a spring thereto. It is among the objects of my invention to eliminate the drilling of such a hole and to provide a shank of such a construction and a spring so formed that the spring may be readily attached to the shank. Such attachment of the spring to the shank may be made by machinery, such as an arbor press, and thus eliminate the hand threading of the spring through the hole to the shank required by the old construction. My construction also prevents accidental withdrawal of the shank from the camera. Another object of my invention is to supply means for preventing the take-up spool from being unwound by a coiled spring on the shank operable with the walls of the casing itself and without the need of separate clutch inserts. My invention also contemplates such other objects, advantages and capabilities as will later more fully appear and which are inherently possessed by my invention.

While I have shown in the accompanying drawing a preferred embodiment of my invention, yet I wish it understood that the same is susceptible of modification and change without departing from the spirit of my invention.

Referring to the drawing, Fig. 1 is an elevational view of the interior of a camera from the rear showing my turnable take-up means in operating position; Fig. 2 is a detail sectional view of the same on line 2—2 of Fig. 1; Fig. 3 is a detail sectional view on line 3—3 of Fig. 2; Fig. 4 is a front elevation of my driving spring; Fig. 5 is an elevation of preferred form of my brake spring; Fig. 6 is a detail sectional view of another form of my shank construction; Fig. 7 is a detail sectional view on line 7—7 of Fig. 6; Fig. 8 is a detail elevation of my knob construction.

The embodiment selected to illustrate my invention comprises a camera in which there is a take-up chamber 70 for housing the take-up spool 71 on which the exposed film is rolled. In order to turn the take-up spool 71 from the exterior of the camera I provide a knob 72 having a shank 73 which extends through an opening 74 in the casing 11 into the take-up chamber 70.

The shaft 75 of the take-up spool 71 extends beyond the film guides 76 and on one end 77 has a groove 78 cut thereacross.

The shank 73 has a peripheral groove 79 adjacent its inner end 80. Said inner end 80 has a central hollowed out portion 81 extending within the shank 73 and a more shallow transverse slot 82.

A spring 83 is formed with an end portion 84 extending into a rounded portion 85. A loop portion 86 connects rounded portion 85 with a complementary opposite rounded portion 87. Beyond said rounded portion 87 the spring bends upwardly and back on itself at 88 to form a substantially straight end portion 89. The rounded portions 85 and 87 are arcs forming portions of a circle having substantially the same inside diameter as that portion of the shank 73 over which the spring fits.

In use the spring 83 is fitted on shank 73, with the rounded portions 85 and 87 fitting within peripheral groove 79 and the straight end portion 89 fitting within slot 82.

The end 77 of take-up spool 71 is fitted into the hollow portion 81 in the end 80 of shank 73, with the groove 78 of the spool 71 receiving the end portion 89 of spring 83.

A slightly different embodiment as shown in Fig. 6 omits the peripheral groove 79 and provides raised portions 90 above and below the positioned rounded portions 85 and 87 so as to prevent accidental displacement of the spring 83.

In use when the knob 72 is turned, its shank 73 of course turns with the knob and carries spring 83 with it. The end portion 89 of the spring 83 contacting the end portion 77 of the take-up spool at the same time turns the take-up spool 71 and rolls the film thereon.

The spring 83 also functions to prevent the accidental withdrawal of the shank 73 from the casing 11, and eliminates the need of a separate washer.

Another spring 91 is coiled around the inner portion of the shank 73. The spring 91 at its outer end has a straight portion 92 on a radius from the center of the spring. When the shank 73 is inserted into opening 74 in casing 11, portion 92 of spring 91 enters slot 93 provided therefor in casing 11 adjoining opening 74. When the knob 72 is turned in the direction for winding film on the take-up spool 71, which is also arranged so that it is the unwinding direction for spring 91, the wall of casing 11 to one side of the slot 93 acts as a clutch and grips portion 92. This permits the spring 91 to turn on shank 73. When the knob 72 is turned in the opposite direction, which is also the direction for winding the spring 91, portion 92 is held by the wall on the other side of said slot 93 and spring 91 tightens on shank 73 so that it cannot be turned. This construction prevents undesired unrolling of exposed film on take-up spool 71.

A different embodiment shown in Fig. 8 discloses coiled spring 91 with portion 92 plus another portion 96 bent from portion 92 and extending parallel to the axis of the shank 73. When shank 73 is inserted into opening 74 in casing 11, portion 96 enters opening 97 in casing 11 provided therefor. This construction functions the same in use as the other embodiment previously described.

Both of these constructions eliminate the need of a separate insert, may be more easily assembled and result in substantial economies.

While I have described portion 92 as on a radius from the center of spring 91 and portion 93 as extending parallel to the axis of the shank 73, yet I do not wish to be limited to this exact construction as these portions 92 and 93 may extend on any desired angle from the spring 91 to fit within a suitable opening or slot placed therefor in the casing 11.

Having thus described my invention, I claim:

1. In a camera, a casing having a take-up spool chamber, a film take-up spool housed in said chamber, said take-up spool having a pair of spaced film guides and a shaft extending between and beyond said guides, said shaft having a transverse groove in one of its ends, a turnable member having a knob positioned at the exterior of said casing, said turnable member having attached to said knob a shank extending through said casing into said take-up chamber, the inner end of said shank being hollow and also having a transverse slot, a spring having a pair of opposite rounded portions and a straight upper portion, said spring mounted on said shank with the rounded portions bearing against the body of the shank and the straight portion lying within the transverse slot, said shaft contacting said shank with the grooved end of said shaft positioned within the hollow end of said shank and the groove of said shaft straddling the straight upper portion of the spring.

2. In combination with a turnable member for the take-up spool of a camera, said turnable member having a shank with a slot in its inner end, a spring for ready and direct attachment to said shank, said spring formed of a single piece and having a pair of opposite rounded portions forming arcs of a circle with substantially the same diameter as that of the shank, said spring bent upwardly and back upon itself to form a straight end portion, the rounded portions of said spring bearing against the rounded body of said shank and the straight end portion of said spring extending through the slot in the end of the shank.

3. In combination with a turnable member for the take-up spool of a camera, said turnable member having a shank with a peripheral groove and a slot in its inner end, a spring for ready and direct attachment to said shank, said spring formed of a single piece and having a pair of opposite rounded portions forming arcs of a circle with substantially the same diameter as that of the shank, said spring bent upwardly and back upon itself to form a straight end portion, the rounded portions of said spring positioned within said peripheral groove of said shank and the straight end portion of said spring extending through the slot in the end of the shank.

JACK GALTER.